(12) United States Patent
Park

(10) Patent No.: US 8,124,679 B2
(45) Date of Patent: Feb. 28, 2012

(54) ELECTROSTATICALLY DISSIPATIVE FLUOROPOLYMERS

(75) Inventor: Edward Hosung Park, Saline, MI (US)

(73) Assignee: Freudenberg-Nok General Partnership, Plymouth, MI (US)

( * ) Notice: Subject to any disclaimer, the term of this patent is extended or adjusted under 35 U.S.C. 154(b) by 745 days.

(21) Appl. No.: 12/123,726

(22) Filed: May 20, 2008

(65) Prior Publication Data

US 2008/0303184 A1    Dec. 11, 2008

Related U.S. Application Data

(62) Division of application No. 10/983,949, filed on Nov. 8, 2004, now Pat. No. 7,381,765.

(51) Int. Cl.
C08K 3/00    (2006.01)

(52) U.S. Cl. ........ 524/401; 524/430; 524/507; 524/525; 524/528; 524/544

(58) Field of Classification Search ............... 524/401, 524/430, 507, 525, 528, 544
See application file for complete search history.

(56) References Cited

U.S. PATENT DOCUMENTS

| | | | |
|---|---|---|---|
| 2,968,649 A | 1/1961 | Pailthorp et al. | |
| 2,972,600 A | 2/1961 | Braidwood | |
| 3,287,440 A | 11/1966 | Giller | |
| 3,616,371 A | 10/1971 | Ukihashi et al. | |
| 3,801,552 A | 4/1974 | Kometani et al. | |
| 3,822,327 A * | 7/1974 | Well | 558/164 |
| 4,035,565 A | 7/1977 | Apotheker et al. | |
| 4,054,455 A | 10/1977 | Schlesinger et al. | |
| 4,129,617 A | 12/1978 | Machi et al. | |
| 4,233,421 A | 11/1980 | Worm | |
| 4,358,559 A | 11/1982 | Holcomb et al. | |
| 4,446,270 A | 5/1984 | Guenthner et al. | |
| 4,483,951 A | 11/1984 | Brenner | |
| 4,491,536 A | 1/1985 | Tomoda et al. | |
| 4,497,935 A | 2/1985 | St. Clair et al. | |
| 4,507,342 A | 3/1985 | Kielbania, Jr. | |
| 4,542,573 A | 9/1985 | Bainard | |
| 4,564,662 A | 1/1986 | Albin | |
| 4,566,927 A | 1/1986 | Wood | |
| 4,688,306 A | 8/1987 | Soni et al. | |
| 4,705,741 A | 11/1987 | Lewis et al. | |
| 4,713,418 A | 12/1987 | Logothetis et al. | |
| 4,808,665 A | 2/1989 | Patel et al. | |
| 4,849,040 A | 7/1989 | Wood | |

(Continued)

FOREIGN PATENT DOCUMENTS

CA    2509656    12/2005

(Continued)

OTHER PUBLICATIONS

Dyneon Fluorel FE-5642Q Technical Data from www.matweb.com (Jan. 2001).

(Continued)

Primary Examiner — Peter D. Mulcahy
Assistant Examiner — Henry Hu
(74) Attorney, Agent, or Firm — Dan Sepanik; Harness, Dickey & Pierce, PLC

(57) ABSTRACT

A composition of fluoropolymer and dispersed conductive particulate provides an electrically conductive polymeric material resistant to static charge buildup. Radiation curing, especially electron beam radiation curing, is favored for curing fluoroelastomer-based precursor articles into desired electrically conductive articles.

12 Claims, 1 Drawing Sheet

U.S. PATENT DOCUMENTS

| | | | |
|---|---|---|---|
| 4,912,171 A | 3/1990 | Grootaert et al. | |
| 4,985,520 A | 1/1991 | Hayashi et al. | |
| 5,015,526 A | 5/1991 | Kubo et al. | |
| 5,055,539 A | 10/1991 | Hengel et al. | |
| 5,057,345 A | 10/1991 | Barrett | |
| 5,262,490 A | 11/1993 | Kolb et al. | |
| 5,266,400 A | 11/1993 | Yarusso et al. | |
| 5,332,769 A | 7/1994 | Kakimoto et al. | |
| 5,338,588 A | 8/1994 | Billiu | |
| 5,354,811 A | 10/1994 | Kamiya et al. | |
| 5,409,777 A | 4/1995 | Kennedy et al. | |
| 5,523,115 A | 6/1996 | Haidos et al. | |
| 5,530,264 A | 6/1996 | Kataoka et al. | |
| 5,565,284 A | 10/1996 | Koga et al. | |
| 5,591,551 A | 1/1997 | Audett et al. | |
| 5,614,577 A | 3/1997 | Sasaki et al. | |
| 5,730,922 A | 3/1998 | Babb et al. | |
| 5,741,855 A | 4/1998 | Kaduk et al. | |
| 5,843,340 A | 12/1998 | Silvi et al. | |
| 5,883,151 A | 3/1999 | Raetzsch et al. | |
| 5,897,794 A | 4/1999 | Hubbard et al. | |
| 5,952,243 A | 9/1999 | Forester et al. | |
| 5,969,066 A | 10/1999 | Enokida et al. | |
| 5,985,949 A | 11/1999 | Seguchi et al. | |
| 6,043,308 A | 3/2000 | Tanahashi et al. | |
| 6,080,450 A | 6/2000 | Cantor | |
| 6,114,079 A * | 9/2000 | Christian et al. | 430/201 |
| 6,169,125 B1 | 1/2001 | Arnold | |
| 6,177,238 B1 | 1/2001 | Fuller et al. | |
| 6,183,901 B1 * | 2/2001 | Ying et al. | 429/129 |
| 6,207,758 B1 | 3/2001 | Brinati et al. | |
| 6,228,943 B1 | 5/2001 | Morikawa et al. | |
| 6,284,412 B1 | 9/2001 | Minakata et al. | |
| 6,323,301 B1 | 11/2001 | Smith et al. | |
| 6,331,586 B1 * | 12/2001 | Thielen et al. | 524/401 |
| 6,358,670 B1 | 3/2002 | Wong et al. | |
| 6,365,250 B2 | 4/2002 | Shifman et al. | |
| 6,419,615 B1 | 7/2002 | Chen et al. | |
| 6,437,014 B1 | 8/2002 | Ho et al. | |
| 6,482,522 B1 | 11/2002 | Parsonage et al. | |
| 6,486,481 B1 | 11/2002 | Tigera | |
| 6,489,420 B1 | 12/2002 | Duchesne et al. | |
| 6,517,657 B1 | 2/2003 | Kuenzel et al. | |
| 6,517,663 B1 | 2/2003 | Kelley et al. | |
| 6,533,955 B1 * | 3/2003 | Molnar et al. | 252/511 |
| 6,602,959 B2 | 8/2003 | Vestberg et al. | |
| 6,624,251 B1 | 9/2003 | Chmielewski | |
| 6,652,943 B2 | 11/2003 | Tukachinsky et al. | |
| 6,812,624 B1 | 11/2004 | Pei et al. | |
| 6,814,584 B2 | 11/2004 | Zaderej | |
| 6,823,903 B2 | 11/2004 | Davis | |
| 6,838,039 B2 | 1/2005 | Morioka et al. | |
| 6,849,314 B2 | 2/2005 | Jing et al. | |
| 6,875,394 B2 | 4/2005 | Soulier | |
| 6,946,522 B2 | 9/2005 | Jacob et al. | |
| 7,135,122 B2 | 11/2006 | Park | |
| 7,230,038 B2 | 6/2007 | Park | |
| 7,244,329 B2 | 7/2007 | Park et al. | |
| 7,342,072 B2 | 3/2008 | Park et al. | |
| 7,381,765 B2 | 6/2008 | Park | |

| | | | |
|---|---|---|---|
| 2002/0198320 A1 | 12/2002 | Chmielewski | |
| 2003/0004257 A1 * | 1/2003 | Kondo et al. | 524/495 |
| 2003/0083616 A1 | 5/2003 | Lee et al. | |
| 2003/0125466 A1 | 7/2003 | Chmielewski | |
| 2004/0126523 A1 | 7/2004 | Masuda et al. | |
| 2004/0157035 A1 | 8/2004 | Guizzetti et al. | |
| 2004/0181022 A1 | 9/2004 | Saito et al. | |
| 2004/0201926 A1 | 10/2004 | Hancer et al. | |
| 2005/0081989 A1 | 4/2005 | Berezuk et al. | |
| 2005/0154136 A1 | 7/2005 | Dharia et al. | |
| 2005/0164127 A1 | 7/2005 | Reid et al. | |
| 2006/0000801 A1 | 1/2006 | Park | |
| 2006/0003126 A1 | 1/2006 | Park et al. | |
| 2006/0003127 A1 | 1/2006 | Park et al. | |
| 2006/0004117 A1 | 1/2006 | Park | |
| 2006/0004142 A1 | 1/2006 | Park et al. | |
| 2006/0004147 A1 | 1/2006 | Park et al. | |
| 2006/0099368 A1 | 5/2006 | Park | |
| 2006/0100333 A1 | 5/2006 | Park | |
| 2006/0100368 A1 | 5/2006 | Park | |
| 2007/0036980 A1 | 2/2007 | Park | |
| 2007/0092731 A1 | 4/2007 | Park et al. | |
| 2007/0093605 A1 | 4/2007 | Adur | |
| 2007/0095790 A1 | 5/2007 | Park | |
| 2007/0213423 A1 | 9/2007 | Park | |

FOREIGN PATENT DOCUMENTS

| | | |
|---|---|---|
| CA | 2509675 | 12/2005 |
| CA | 2509703 | 12/2005 |
| EP | 0509373 | 10/1992 |
| EP | 1254936 | 11/2002 |
| EP | 1655739 | 5/2006 |
| EP | 1655739 A1 * | 5/2006 |
| JP | 61168649 | 7/1986 |
| WO | WO 96/07695 | 3/1996 |
| WO | WO 98/31541 | 7/1998 |
| WO | WO 01/02508 | 1/2001 |
| WO | WO 02/42372 | 5/2002 |
| WO | WO-02/42372 A1 * | 5/2002 |
| WO | WO 2005/012410 | 2/2005 |

OTHER PUBLICATIONS

Worm, A. and Grootaert, W. "Fluorocarbon Elastomers," Encyclopedia of Polymer Science and Technology, vol. 2. Article Online Posting Date: Oct. 22, 2001.

Electron-Beam Curing of Polymeric Composites as an Enabling Technology for Advanced Manufacturing, E-Beam Services, Inc., presented at Internatl Composites Expo May 10-13, 1999.

Electron-Beam Processing of Plastics: An Alternative to Chemical Additives, E-BEAM Services, Inc., Presented at 58th SPE Annual Technology Conf May 11, 2000.

Kenji Nagai Figure from "Technical Issues and Counter Measures for FKM", Industrial Material, pp. 62-65, vol. 44, No. 3 Mar. 1996.

MatWeb Material Data Sheet—Fluorel FE-5830Q http://www.matweb.com, (Jan. 2001).

MatWeb Material Data Sheet—Fluorel FT-2350 http://www.matweb.com, (Jan. 2001).

* cited by examiner

ELECTROSTATICALLY DISSIPATIVE FLUOROPOLYMERS

This application is a divisional application of U.S. patent application Ser. No. 10/983,949 filed Nov. 8, 2004, now U.S. Pat. No. 7,381,765 the disclosure of which is incorporated herein by reference.

This invention relates to an admixture of a fluoropolymer and dispersed conductive particulate and to articles formed from an admixture of a fluoropolymer and dispersed conductive particulate so that static charge buildup will not occur on the articles.

Fluoropolymers are well known for providing good chemical resistance and toughness in many different applications. Fluoroelastomer fluoropolymers also provide elasticity in derived articles with commensurate mechanical robustness and also excellent compressive sealing against the surface of another article. Thermoplastic elastomer (TPE) and thermoplastic vulcanizate (TPV) materials combine properties of thermoplastics and properties of elastomers. In this regard, TPE and TPV materials are usually multi-phase mixtures of elastomer (vulcanizate) in thermoplastic; the TPE providing multi-phase characteristics at the molecular level as a block copolymer of elastomer and thermoplastic, and the TPV providing a multi-phase polymeric admixture of at least one agglomerated elastomer (vulcanizate) phase and at least one agglomerated thermoplastic plastic phase which are admixed to co-exist as a dispersion of one phase in the other. Either the TPV or the TPE is liquefied by heating to above the melting point enabled by the thermoplastic phase of either the agglomerated dispersive phase admixture or block copolymer, respectively.

The chemical resistance, toughness, and elasticity of fluoroelastomer and fluoropolymers and the thermoplastic aspect of TPE and TPV mixtures incorporating fluoroelastomers is of great value in enabling forming of desired articles. However, one of the drawbacks of items made from these materials is that electrical charge can build up on the surface of the article. This charge buildup can be hazardous if the article is in service in applications or environments where flammable or explosive materials are present.

What is needed is a way for fluoroelastomer or (fluoropolymer, TPE, or TPV) materials incorporating fluoroelastomer to be formed with the benefit of their traditional properties where, after such forming has been achieved, the derived article will not retain electrical charge. This and other needs are achieved with the invention.

SUMMARY

The invention provides a composition comprising:
(a) a continuous polymeric phase of fluoropolymer; and
(b) a dispersed phase of conductive particulate, the dispersed phase comprising a plurality of conductive particles dispersed in the continuous polymeric phase, so that the composition provides an electrically conductive polymeric material having an post-cured electrical resistivity of less than about of $1\times10^{-3}$ Ohm-m at 20 degrees Celsius.

The invention is also for a composition of the above phases with cured fluoropolymer.

In another aspect, the fluoropolymer is any of fluoroelastomer vulcanized to provide a compressive set value from about 5 to about 100 percent of a mathematical difference between a non-vulcanized compressive set value for the fluoroelastomer and a fully-vulcanized compressive set value for the fluoroelastomer, fluoroelastomer thermoplastic vulcanizate vulcanized to provide a compressive set value from about 5 to about 100 percent of a mathematical difference between a non-vulcanized compressive set value for the fluoroelastomer thermoplastic vulcanizate and a fully-vulcanized compressive set value for the fluoroelastomer of the fluoroelastomer thermoplastic vulcanizate, fluoroelastomer-based thermoplastic elastomer vulcanized to provide a compressive set value from about 5 to about 100 percent of a mathematical difference between a non-vulcanized compressive set value for the thermoplastic elastomer and a fully-vulcanized compressive set value for the thermoplastic elastomer, and a blend of fluoroelastomer precursor gum and thermoplastic where the precursor gum has a glass transition temperature, a decomposition temperature, a Mooney viscosity of from about 0 to about 150 $ML_{1+10}$ at 121 degrees Celsius, and, at a temperature having a value that is not less than the glass transition temperature and not greater than the decomposition temperature, a compressive set value from about 0 to about 5 percent of a mathematical difference between a non-vulcanized compressive set value for fluoroelastomer derived from the fluoroelastomer precursor gum and a fully-vulcanized compressive set value for the derived fluoroelastomer.

In yet a further aspect, the fluoroelastomer is any of
(i) vinylidene fluoride/hexafluoropropylene copolymer fluoroelastomer having from about 66 weight percent to about 69 weight percent fluorine and a Mooney viscosity of from about 0 to about 130 $ML_{1+10}$ at 121 degrees Celsius,
(ii) vinylidene fluoride/perfluorovinyl ether/tetrafluoroethylene terpolymer fluoroelastomer having at least one cure site monomer and from about 64 weight percent to about 67 weight percent fluorine and a Mooney viscosity of from about 50 to about 100 $ML_{1+10}$ at 121 degrees Celsius,
(iii) tetrafluoroethylene/propylene/vinylidene fluoride terpolymer fluoroelastomer having from about 59 weight percent to about 63 weight percent fluorine and a Mooney viscosity of from about 25 to about 45 $ML_{1+10}$ at 121 degrees Celsius,
(iv) tetrafluoroethylene/ethylene/perfluorovinyl ether terpolymer fluoroelastomer having at least one cure site monomer and from about 60 weight percent to about 65 weight percent fluorine and a Mooney viscosity of from about 40 to about 80 $ML_{1+10}$ at 121 degrees Celsius,
(v) vinylidene fluoride/hexafluoropropylene/tetrafluoroethylene terpolymer fluoroelastomer having at least one cure site monomer and from about 66 weight percent to about 72.5 weight percent fluorine and a Mooney viscosity of from about 15 to about 90 $ML_{1+10}$ at 121 degrees Celsius,
(vi) tetrafluoroethylene/propylene copolymer fluoroelastomer having about 57 weight percent fluorine and a Mooney viscosity of from about 25 to about 115 $ML_{1+10}$ at 121 degrees Celsius,
(vii) tetrafluoroethylene/ethylene/perfluorovinyl ether/vinylidene fluoride tetrapolymer fluoroelastomer having at least one cure site monomer and from about 59 weight percent to about 64 weight percent fluorine and a Mooney viscosity of from about 30 to about 70 $ML_{1+10}$ at 121 degrees Celsius,
(viii) tetrafluoroethylene/perfluorovinyl ether copolymer fluoroelastomer having at least one cure site monomer and from about 69 weight percent to about 71 weight percent fluorine and a Mooney viscosity of from about 60 to about 120 $ML_{1+10}$ at 121 degrees Celsius, fluoroelastomer corresponding to the formula $[-TFE_q\text{-}HFP_r\text{-}VdF_s\text{-}]_d$ and (ix) combinations thereof, where TFE is essentially a tetrafluoroethyl block, HFP is essentially a hexafluoropropyl block, and VdF is essentially a vinylidyl fluoride block, and products qd and rd and sd collectively provide proportions of TFE, HFP, and VdF whose values are within element 101 of FIG. 1.

In another aspect, the conductive particulate is any of conductive carbon black, conductive carbon fiber, conductive carbon nanotubes, conductive graphite powder, conductive graphite fiber, bronze powder, bronze fiber, steel powder, steel fiber, iron powder, iron fiber, copper powder, copper fiber, silver powder, silver fiber, aluminum powder, aluminum fiber, nickel powder, nickel fiber, wolfram powder, wolfram fiber, gold powder, gold fiber, copper-manganese alloy powder, copper-manganese fiber, and combinations thereof. In another aspect filler is mixed into the composition, with the filler being any of fiberglass particulate, inorganic fiber particulate, carbon fiber particulate, ground rubber particulate, polytetrafluorinated ethylene particulate, microspheres, and carbon nanotubes.

In another aspect, the conductive particles are coated with a coating to provide coated conductive particles as the conductive particulate, the conductive particles having a first surface tension between the conductive particles and the fluoropolymer, the coated conductive particles having a second surface tension between the coated conductive particles and the fluoropolymer, the second surface tension being less than the first surface tension.

In yet another aspect, essentially all of the conductive particles independently have a cross-sectional diameter from about 0.1 microns to about 100 microns.

In yet another aspect, the fluoropolymer comprises from about 20 weight percent to about 90 weight percent of the composition.

In yet another aspect, the cured fluoropolymer is derived from radiation curing of a fluoropolymer precursor.

In one aspect of this, the radiation is any of ultraviolet radiation, infrared radiation, ionizing radiation, electron beam radiation, x-ray radiation, an irradiating plasma, a discharging corona, and a combination of these.

In yet another aspect, the cured fluoropolymer is derived from curing fluoroelastomer with a curing agent any of a peroxide, a bisphenol, and a combination of these.

In yet another aspects, the invention provides a method for making a composition, comprising admixing the above described materials, for further forming the admixture into an article, and/or for a precursor article of the article to be formed of the admixture with subsequent curing of the precursor article into the article.

In one aspect, curing comprises admixing, prior to the forming, a curing agent into the admixture where the curing agent is any of a peroxide, a bisphenol, and a combination of these.

In yet another aspect, admixing is achieved with any of batch polymer mixer, a roll mill, a continuous mixer, a single-screw mixing extruder, and a twin-screw extruder mixing extruder.

Further areas of applicability will become apparent from the detailed description provided hereinafter. It should be understood that the detailed description and specific examples, while indicating embodiments of the invention, are intended for purposes of illustration only and are not intended to limit the scope of the invention.

BRIEF DESCRIPTION OF THE DRAWING

The present invention will become more fully understood from the detailed description and the accompanying drawing of FIG. 1.

Figure 1:
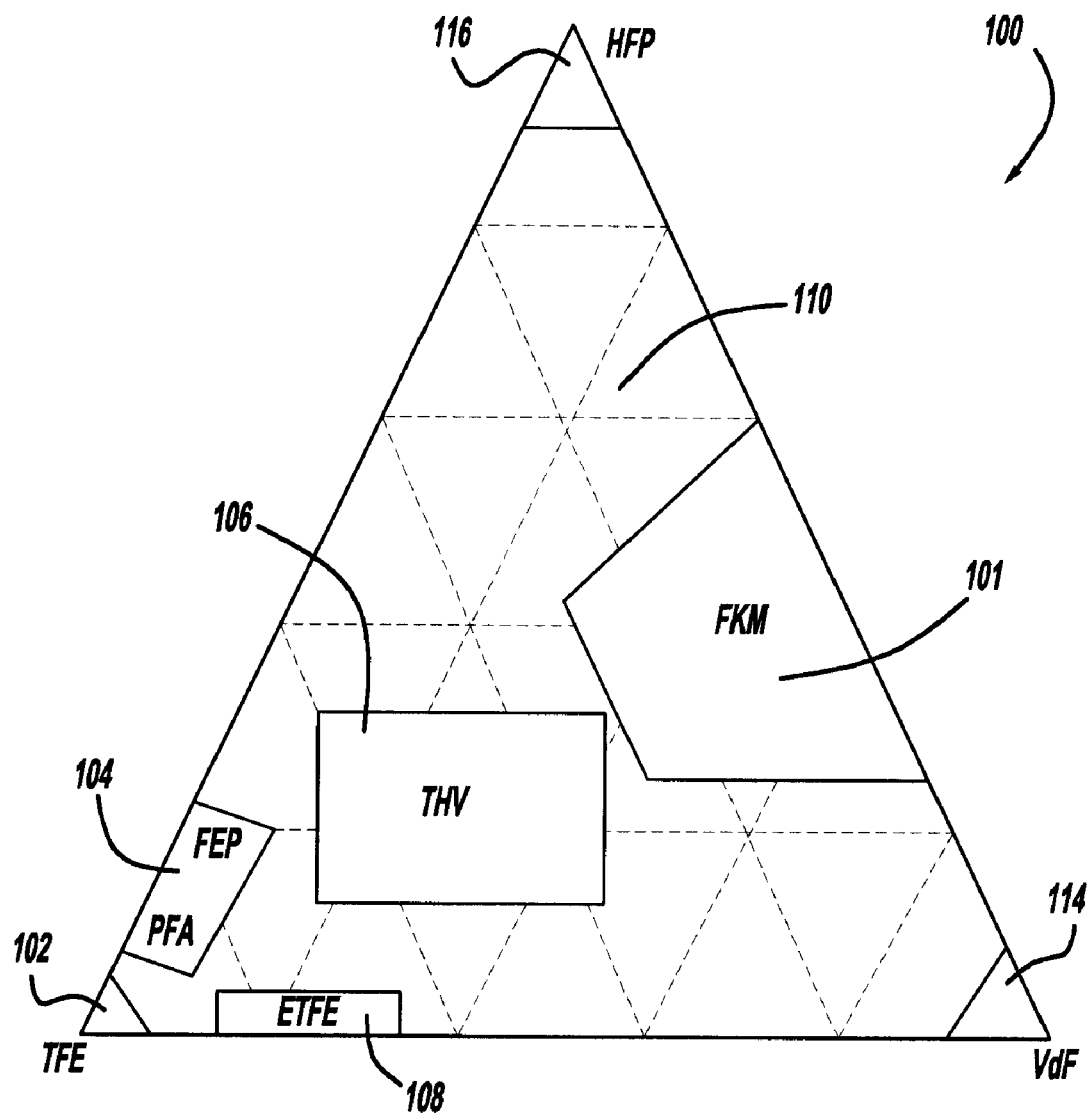
FIG. 1 presents a ternary composition diagram for tetrafluoroethylene (TFE), hexafluoropropylene (HFP), and vinylidene fluoride blends.

It should be noted that the figure set forth herein is intended to exemplify the general characteristics of an apparatus, materials, and methods among those of this invention, for the purpose of the description of such embodiments herein. The figure may not precisely reflect the characteristics of any given embodiment, and is not necessarily intended to define or limit specific embodiments within the scope of this invention.

DESCRIPTION

The following definitions and non-limiting guidelines must be considered in reviewing the description of this invention set forth herein.

The headings (such as "Introduction" and "Summary") and sub-headings used herein are intended only for general organization of topics within the disclosure of the invention, and are not intended to limit the disclosure of the invention or any aspect thereof. In particular, subject matter disclosed in the "Introduction" may include aspects of technology within the scope of the invention, and may not constitute a recitation of prior art. Subject matter disclosed in the "Summary" is not an exhaustive or complete disclosure of the entire scope of the invention or any embodiments thereof.

The citation of references herein does not constitute an admission that those references are prior art or have any relevance to the patentability of the invention disclosed herein. All references cited in the Description section of this specification are hereby incorporated by reference in their entirety.

The description and specific examples, while indicating embodiments of the invention, are intended for purposes of illustration only and are not intended to limit the scope of the invention. Moreover, recitation of multiple embodiments having stated features is not intended to exclude other embodiments having additional features, or other embodiments incorporating different combinations the stated of features.

As used herein, the words "preferred" and "preferably" refer to embodiments of the invention that afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, the word "include," and its variants, is intended to be non-limiting, such that recitation of items in a list is not to the exclusion of other like items that may also be useful in the materials, compositions, devices, and methods of this invention.

Most items of manufacture represent an intersection of considerations in both mechanical design and in materials design. In this regard, improvements in materials frequently are intertwined with improvements in mechanical design. The embodiments describe compounds, compositions, assemblies, and manufactured items that enable improvements in polymer material synthesis to be fully exploited.

The examples and other embodiments described herein are exemplary and not intended to be limiting in describing the full scope of compositions and methods of this invention. Equivalent changes, modifications and variations of specific embodiments, materials, compositions and methods may be made within the scope of the present invention, with substantially similar results.

Preferred embodiments provide an electrically conductive fluoropolymer material. In this regard, details in polymer materials for use in the embodiments are first discussed.

Carbon-chain-based polymeric materials (polymers) are usefully defined as falling into one of three traditionally separate generic primary categories: thermoset materials (one type of plastic), thermoplastic materials (a second type of plastic), and elastomeric (or rubber-like) materials (elastomeric materials are not generally referenced as being "plastic" insofar as elastomers do not provide the property of a solid "finished" state). An important measurable consideration with respect to these three categories is the concept of a melting point—a point where a solid phase and a liquid phase of a material co-exist. In this regard, a thermoset material essentially cannot be melted after having been "set" or "cured" or "cross-linked". Precursor component(s) to the thermoset plastic material are usually shaped in molten (or essentially liquid) form, but, once the setting process has executed, a melting point essentially does not exist for the material. A thermoplastic plastic material, in contrast, hardens into solid form (with attendant crystal generation), retains its melting point essentially indefinitely, and re-melts (albeit in some cases with a certain amount of degradation in general polymeric quality) after having been formed. An elastomeric (or rubber-like) material does not have a melting point; rather, the elastomer has a glass transition temperature where the polymeric material demonstrates an ability to usefully flow, but without co-existence of a solid phase and a liquid phase at a melting point.

Elastomers are frequently transformed into very robust flexible materials through the process of vulcanization. Depending upon the degree of vulcanization, the glass transition temperature may increase to a value that is too high for any practical attempt at liquefaction of the vulcanizate. Vulcanization implements inter-bonding between elastomer chains to provide an elastomeric material more robust against deformation than a material made from the elastomers in their pre-vulcanized state. In this regard, a measure of performance denoted as a "compression set value" is useful in measuring the degree of vulcanization ("curing", "cross-linking") in the elastomeric material. For the initial elastomer, when the material is in non-vulcanized elastomeric form, a non-vulcanized compression set value is measured according to ASTM D395 Method B and establishes thereby an initial compressive value for the particular elastomer. Under extended vulcanization, the elastomer vulcanizes to a point where its compression set value achieves an essentially constant maximum respective to further vulcanization, and, in so doing, thereby defines a material where a fully vulcanized compression set value for the particular elastomer is measurable. In applications, the elastomer is vulcanized to a compression set value useful for the application.

Augmenting the above-mentioned three general primary categories of thermoset plastic materials, thermoplastic plastic materials, and elastomeric materials are two blended combinations of thermoplastic and elastomers (vulcanizates) generally known as TPEs and TPVs. Thermoplastic elastomer (TPE) and thermoplastic vulcanizate (TPV) materials have been developed to partially combine the desired properties of thermoplastics with the desired properties of elastomers. As such, TPV materials are usually multi-phase admixtures of elastomer (vulcanizate) in thermoplastic. Traditionally, the elastomer (vulcanizate) phase and thermoplastic plastic phase co-exist in phase admixture after solidification of the thermoplastic phase; and the admixture is liquefied by heating the admixture above the melting point of the thermoplastic phase of the TPV. TPE materials are multi-phase mixtures, at the molecular level, of elastomer and thermoplastic and provide thereby block co-polymers of elastomer and thermoplastic. In this regard, TPEs are co-oligomeric block co-polymers derived from polymerization of at least one thermoplastic oligomer and at least one elastomeric oligomer. TPVs and TPEs both have melting points enabled by their respective thermoplastic phase(s).

Thermoset plastic materials, thermoplastic plastic materials, elastomeric materials, thermoplastic elastomer materials, and thermoplastic vulcanizate materials generally are not considered to be electrically conductive. As such, electrical charge buildup on surfaces of articles made of these materials can occur to provide a "static charge" on a charged surface. When discharge of the charge buildup occurs to an electrically conductive material proximate to such a charged surface, an electrical spark manifests the essentially instantaneous current flowing between the charged surface and the electrical conductor. Such a spark can be hazardous if the article is in service in applications or environments where flammable or explosive materials are present. Rapid discharge of static electricity can also damage some items (for example, without limitation, microelectronic articles) as critical electrical insulation is subjected to an instantaneous surge of electrical energy. Grounded articles made of materials having an electrical resistivity of less than about of $1 \times 10^{-3}$ Ohm-m at 20 degrees Celsius are generally desired to avoid electrical charge buildup. Accordingly, in one embodiment, a dispersed phase of conductive particulate is provided in a fluoropolymer material to provide an electrically conductive polymeric material having an post-cured electrical resistivity of less than about of $1 \times 10^{-3}$ Ohm-m at 20 degrees Celsius. This dispersed phase is made of a plurality of conductive particles dispersed in a continuous polymeric phase of fluoropolymer. In this regard, when, in some embodiments, the continuous polymeric phase of fluoropolymer is itself a multi-polymeric-phase polymer blend and/or admixture, the dispersed phase of conductive particles are preferably dispersed throughout the various polymeric phases without specificity to any one of the polymeric phases in the multi-polymeric-phase polymer.

The conductive particles used in alternative embodiments of electrically conductive polymeric materials include conductive carbon black, conductive carbon fiber, conductive carbon nanotubes, conductive graphite powder, conductive graphite fiber, bronze powder, bronze fiber, steel powder, steel fiber, iron powder, iron fiber, copper powder, copper fiber, silver powder, silver fiber, aluminum powder, aluminum fiber, nickel powder, nickel fiber, wolfram powder, wolfram fiber, gold powder, gold fiber, copper-manganese alloy powder, copper-manganese fiber, and combinations thereof.

The continuous polymeric phase in one set of alternative embodiments of electrically conductive polymeric materials includes a polymer or polymer admixture from a fundamental polymer set of fluoroelastomer vulcanized to provide a compressive set value from about 5 to about 100 percent of a mathematical difference (as further discussed in the following paragraph) between a non-vulcanized compressive set value for the fluoroelastomer and a fully-vulcanized compressive set value for the fluoroelastomer, fluoroelastomer thermoplastic vulcanizate vulcanized to provide a compressive set value from about 5 to about 100 percent of a mathematical difference between a non-vulcanized compressive set value for the fluoroelastomer of the fluoroelastomer thermoplastic vulcanizate and a fully-vulcanized compressive set value for the fluoroelastomer of the fluoroelastomer thermoplastic vulcanizate, fluoroelastomer-based thermoplastic elastomer vulcanized to provide a compressive set value from about 5 to about 100 percent of a mathematical difference between a non-vulcanized compressive set value for the thermoplastic elastomer and a fully-vulcanized compressive set value for the thermoplastic elastomer.

With respect to a difference between a non-vulcanized compressive set value for an elastomer and a fully-vulcanized compressive set value for an elastomer, it is to be noted that percentage in the 0 to about 100 percent range respective to a mathematical difference (between a non-vulcanized compression set value respective to a partially-vulcanized elastomer or elastomer gum and a fully-vulcanized compression set value respective to the elastomer) applies to the degree of vulcanization in the elastomer rather than to percentage recovery in a determination of a particular compression set value. As an example, an elastomer prior to vulcanization has a non-vulcanized compression set value of 72 (which could involve a 100% recovery from a thickness measurement under compression to a thickness measurement after compression is released). After extended vulcanization, the vulcanized elastomer demonstrates a fully-vulcanized compression set value of 10. A mathematical difference between the values of 72 and 10 indicate a range of 62 between the non-vulcanized compression set value respective to the base elastomer and a fully-vulcanized compression set value respective to the base elastomer. Since the compression set value decreased with vulcanization in the example, a compressive set value within the range of 50 to about 100 percent of a mathematical difference between a non-vulcanized compression set value respective to the base elastomer and a fully-vulcanized compression set value respective to the base elastomer would therefore be achieved with a compressive set value between about 41 (50% between 72 and 10) and about 10 (the fully-vulcanized compression set value).

Returning now to specific considerations in the continuous polymeric phase of electrically conductive polymeric material embodiments, a blend of fluoroelastomer precursor gum and thermoplastic provides a gum-enhanced admixture in a further set of alternative electrically conductive polymeric material embodiments. In this regard, elastomer precursor gum is a effectively a low molecular weight post-oligomer precursor for an elastomeric material. More specifically, the fluoroelastomer gum has a glass transition temperature, a decomposition temperature, and, at a temperature having a value that is not less than the glass transition temperature and not greater than the decomposition temperature, a compressive set value (as further described herein) from about 0 to about 5 percent of a mathematical difference between a non-vulcanized compressive set value for elastomer derived from the elastomer precursor gum and a fully-vulcanized compressive set value for the derived elastomer. The flurorelastomer precursor gum has a Mooney viscosity of from about 0 to about 150 $ML_{1+10}$ at 121 degrees Celsius.

A gum-enhanced polymeric admixture in a continuous polymeric phase in an electrically conductive polymeric material embodiment alternatively is an interpenetrated structure of polymer from the above fundamental polymer set admixed with elastomer precursor gum, a continuous phase of polymer from the above fundamental polymer set admixed with a dispersed phase of elastomer precursor gum, or a dispersed phase of polymer from the above fundamental polymer set admixed into a continuous phase of elastomer precursor gum.

In the above embodiments fluoroelastomer (either as a material or material of reference in either the fundamental polymer set or an elastomer ultimately derived from an elastomer precursor gum) is any of (i) vinylidene fluoride/hexafluoropropylene copolymer fluoroelastomer having from about 66 weight percent to about 69 weight percent fluorine and a Mooney viscosity of from about 0 to about 130 $ML_{1+10}$ at 121 degrees Celsius, (ii) vinylidene fluoride/perfluorovinyl ether/tetrafluoroethylene terpolymer fluoroelastomer having at least one cure site monomer and from about 64 weight percent to about 67 weight percent fluorine and a Mooney viscosity of from about 50 to about 100 $ML_{1+10}$ at 121 degrees Celsius, (iii) tetrafluoroethylene/propylene/vinylidene fluoride terpolymer fluoroelastomer having from about 59 weight percent to about 63 weight percent fluorine and a Mooney viscosity of from about 25 to about 45 $ML_{1+10}$ at 121 degrees Celsius, (iv) tetrafluoroethylene/ethylene/perfluorovinyl ether terpolymer fluoroelastomer having at least one cure site monomer and from about 60 weight percent to about 65 weight percent fluorine and a Mooney viscosity of from about 40 to about 80 $ML_{1+10}$ at 121 degrees Celsius, (v) vinylidene fluoride/hexafluoropropylene/tetrafluoroethylene terpolymer fluoroelastomer having at least one cure site monomer and from about 66 weight percent to about 72.5 weight percent fluorine and a Mooney viscosity of from about 15 to about 90 $ML_{1+10}$ at 121 degrees Celsius, (vi) tetrafluoroethylene/propylene copolymer fluoroelastomer having about 57 weight percent fluorine and a Mooney viscosity of from about 25 to about 115 $ML_{1+10}$ at 121 degrees Celsius, (vii) tetrafluoroethylene/ethylene/perfluorovinyl ether/vinylidene fluoride tetrapolymer fluoroelastomer having at least one cure site monomer and from about 59 weight percent to about 64 weight percent fluorine and a Mooney viscosity of from about 30 to about 70 $ML_{1+10}$ at 121 degrees Celsius, (vii) tetrafluoroethylene/perfluorovinyl ether copolymer fluoroelastomer having at least one cure site monomer and from about 69 weight percent to about 71 weight percent fluorine and a Mooney viscosity of from about 60 to about 120 $ML_{1+10}$ at 121 degrees Celsius, fluoroelastomer corresponding to the formula

and (ix) combinations thereof, (x) where TFE is essentially a tetrafluoroethyl block, HFP is essentially a hexafluoropropyl block, and VdF is essentially a vinylidyl fluoride block, and products qd and rd and sd collectively provide proportions of TFE, HFP, and VdF whose values are within element 101 of FIG. 1 as described in the following paragraph.

Turning now to FIG. 1, a ternary composition diagram 100 is presented showing tetrafluoroethylene (TFE), hexafluoropropylene (HFP), and vinylidene fluoride weight percentage combinations for making various co-polymer blends. Region 101 defines blends of respective tetrafluoroethyl, hexafluoropropyl, and vinylidyl fluoride overall block amounts that combine to form fluoroelastomer (FKM) polymers. Region 104 defines blends of respective tetrafluoroethyl, hexafluoropropyl, and vinylidyl fluoride overall block amounts that combine to form perfluoroalkoxy tetrafluoroethylene/perfluoromethylvinyl ether and tetrafluoroethylene/hexafluoropropylene polymers. Region 106 defines blends of respective tetrafluoroethyl, hexafluoropropyl, and vinylidyl fluoride overall block amounts that combine to form tetrafluoroethylene/hexafluoropropylene/vinylidene fluoride polymers. Region 108 defines blends of respective tetrafluoroethyl, hexafluoropropyl, and vinylidyl fluoride overall block amounts that combine to form ethylene tetrafluoroethylene polymers. Region 110 defines blends of respective tetrafluoroethyl, hexafluoropropyl, and vinylidyl fluoride overall block amounts that traditionally have not generated useful co-polymers. Region 102 defines blends of respective tetrafluoroethyl, hexafluoropropyl, and vinylidyl fluoride overall block amounts that combine to form polytetrafluoroethylene (PTFE) polymers. Region 114 defines blends of respective tetrafluoroethyl, hexafluoropropyl, and vinylidyl fluoride overall block amounts that combine to form polyvinylidene fluoride (PVdF) polymers. Region 116 defines blends of respective tetrafluoroethyl, hexafluoropropyl, and vinylidyl fluoride overall block amounts that combine to form polyhexafluoropropylene (PHFP) polymers.

Thermoplastic in TPE and TPV embodiments includes any of polyamide, nylon 6, nylon 66, nylon 64, nylon 63, nylon 610, nylon 612, amorphous nylon, polyester, polyethylene terephthalate, polystyrene, polymethyl methacrylate, thermoplastic polyurethane, polybutylene, polyesteretherketone, polyimide, fluoroplastic, polyvinylidene fluoride, polysulfone, polycarbonate, polyphenylene sulfide, polyethylene, polypropylene, polyacetal polymer, polyacetal, perfluoroalkoxy(tetrafluoroethylene/perfluoromethylvinyl ether), tetrafluoroethylene/perfluoromethylvinyl ether, ethylene tetrafluoroethylene, ethylene chlorotrifluoroethylene, tetrafluoroethylene/hexafluoropropylene/vinylidene fluoride, tetrafluoroethylene/hexafluoropropylene, polyester thermoplastic ester, polyester ether copolymer, polyamide ether copolymer, polyamide thermoplastic ester, and combinations thereof.

Another form of modification to the traditional three general primary categories of thermoset plastic materials, thermoplastic plastic materials, and elastomeric materials is cross-linked thermoplastic material, where a thermoplastic undergoes a certain degree of cross-linking via a treatment such as irradiation after having been solidified (to contain crystals of the thermoplastic polymer). In this regard, while the melting point of crystals in a cross-linked thermoplastic is sustained in all crystalline portions of the thermoplastic, the dynamic modulus of the cross-linked thermoplastic will be higher than that of the non-crosslinked thermoplastic due to crosslinkage between thermoplastic molecules in the amorphous phase of the thermoplastic. Further details in this regard are described in U.S. patent application Ser. No. 10/881,106 filed on Jun. 30, 2004 and entitled ELECTRON BEAM INTER-CURING OF PLASTIC AND ELASTOMER BLENDS incorporated by reference herein. In one such embodiment, the plastic moiety is derived from thermoplastic plastic; in a second embodiment, the plastic is derived from thermoset plastic.

Electron beam processing is usually effected with an electron accelerator. Individual accelerators are usefully characterized by their energy, power, and type. Low-energy accelerators provide beam energies from about 150 keV to about 2.0 MeV. Medium-energy accelerators provide beam energies from about 2.5 to about 8.0 MeV. High-energy accelerators provide beam energies greater than about 9.0 MeV. Accelerator power is a product of electron energy and beam current. Such powers range from about 5 to about 300 kW. The main types of accelerators are: electrostatic direct-current (DC), electrodynamic DC, radiofrequency (RF) linear accelerators (LINACS), magnetic-induction LINACs, and continuous-wave (CW) machines.

A polymeric admixture established by admixing differentiated phases of polymer usually differentiates the continuous phase and dispersed phase on the basis of relative viscosity between two initial polymeric fluids (where the first polymeric fluid has a first viscosity and the second polymeric fluid has a second viscosity). The phases are differentiated during admixing of the admixture from the two initial polymeric fluids. In this regard, the phase having the lower viscosity of the two phases will generally encapsulate the phase having the higher viscosity. The lower viscosity phase will therefore usually become the continuous phase in the admixture, and the higher viscosity phase will become the dispersed phase. When the viscosities are essentially equal, the two phases will form an interpenetrated structure of polymer chains. Accordingly, in general dependence upon the relative viscosities of the admixed elastomer and thermoplastic, several embodiments of admixed compositions derive from the general admixing approach and irradiation.

Preferably, each of the vulcanized, partially vulcanized, or gum elastomeric dispersed portions in a polymeric admixture has a cross-sectional diameter from about 0.1 microns to about 100 microns. In this regard, it is to be further appreciated that any portion is essentially spherical in shape in one embodiment, or, in an alternative embodiment, is filamentary in shape with the filament having a cross-sectional diameter from about 0.1 microns to about 100 microns. Comparably, when the vulcanized, partially vulcanized, or gum elastomeric portion is the continuous portion, the dispersed polymeric portion also has a cross-sectional diameter from about 0.1 microns to about 100 microns. The continuous phase of the polymeric admixture collectively is from about 20 weight percent to about 90 weight percent of the polymeric admixture composition.

In one embodiment, filler (particulate material contributing to the performance properties of the compounded electrically conductive polymeric material respective to such properties as, without limitation, bulk, weight, and/or viscosity while being essentially chemically inert or essentially reactively insignificant respective to chemical reactions within the compounded polymer) is also admixed into the formulation. The filler particulate is any material such as, without limitation, fiberglass particulate, inorganic fiber particulate, carbon fiber particulate, ground rubber particulate, or polytetrafluorinated ethylene particulate having a mean particle size from about 5 to about 50 microns; fiberglass, ceramic, or glass microspheres preferably having a mean particle size from about 5 to about 120 microns; or carbon nanotubes.

Turning now to method embodiments for making material embodiments discussed in the foregoing, one method embodiment for making a material compound embodiment is to admix the components of the continuous polymer phase with a conventional mixing system such as a batch polymer mixer, a roll mill, a continuous mixer, a single-screw mixing extruder, a twin-screw extruder mixing extruder, and the like until the continuous polymeric phase has been fully admixed. Specific commercial batch polymer mixer systems in this regard include any of a Moriyama mixer, a Banbury mixer, and a Brabender mixer. In another embodiment the elastomeric and thermoplastic components are intermixed at elevated temperature in the presence of an additive package in conventional mixing equipment as noted above. The conductive particulate and optional filler is then admixed into the continuous polymeric phase until fully dispersed in the continuous polymeric phase to yield the electrically conductive polymeric material. In one embodiment, the components of the continuous polymer phase and the conductive (and optional filler) particulate are simultaneously admixed with a conventional mixing system such as a roll mill, continuous mixer, a single-screw mixing extruder, a twin-screw extruder mixing extruder, and the like until the conductive material has been fully admixed. In one embodiment, a curing agent (a fluoroelastomer curing agent such as preferably, without limitation, a peroxide, a bisphenol, and a combination of these when said fluoropolymer contains fluoroelastomer) is admixed into the elastomer precursor solution shortly before use. In another embodiment, the electrically conductive fluoropolymeric material is molded into a desired article precursor and the molded precursor is cured with radiation to yield the desired article.

A further advantageous characteristic of fully admixed compositions is that the admixture is readily processed and/or reprocessed by conventional plastic processing techniques such as extrusion, injection molding, and compression molding. Scrap or flashing is also readily salvaged and reprocessed with thermoplastic processing techniques.

In one embodiment, a coating is applied to the conductive particles (and optionally to the optional filler), prior to the admixing, with a coating to provide coated conductive particles (and optionally coated filler) as the conductive particulate (and optional filler). In this regard, given that the uncoated particles have a (first) surface tension between the uncoated particles and the fluoropolymer, the coating is chosen so that the coated particles have a (second) surface tension between the coated particles and the fluoropolymer that is less than the first surface tension. The coating is applied to enable expedited admixing of the particulate into a full dispersion within the continuous polymer phase. The coating is selected and the coated conductive particles are dispersed in sufficient quantity so that the desired electrical resistivity is achieved in the desired article.

In a preferred embodiment, the irradiative curing is achieved by irradiating the elastomer molecule with electron beam radiation (preferably of from about 0.1 MeRAD to about 40 MeRAD and, more preferably, from about 5 MeRAD to about 20 MeRAD).

In one embodiment, the irradiative curing occurs within a cavity of a mold, where the housing of the mold enables transmission of an electron beam from an outside surface of the housing through the housing surface defining (at least in part) the cavity and thereby to the elastomer molecule. The penetration depth of a particular electron beam depends upon the strength of the electron beam, the density of the housing materials, and the particular material used in the housing. In one embodiment, cross-linking and/or curing of the molded precursor article is achieved by irradiating the dispersed and continuous phases within a cavity of the previously described mold, where the housing of the mold enables transmission of an electron beam from an outside surface of the housing through a surface of the cavity and thereby to the dispersed and continuous phases. In this regard, the entire mold housing is, in one embodiment, made of a material (such as glass, steel, plastic, brass, or aluminum) that will transmit the radiation (preferably an electron beam). In an alternative embodiment, a portion of the mold housing is made of a material that will transmit the radiation. In yet another embodiment, a beam port (glass, steel, plastic, brass, or aluminum) is embedded into the mold housing and the beam port is made of a material that will transmit the radiation.

The radiation used for curing can be ultraviolet radiation, infrared radiation, ionizing radiation, electron beam radiation, x-ray radiation, an irradiating plasma, a discharging corona, or a combination of these.

In alternative embodiments, molding of electrically conductive polymeric material is achieved by various respective processes. Traditional processes such a calendaring, pultrusion, multilayer co-extrusion, and injection molding are used in alternative process embodiments to achieve manufacture of the desired article.

Yet other applications (article embodiments) are for other packing sealant articles such as gaskets, dynamic seals, static seals, o-rings, co-extruded hose, and items having a sealant article such as a hose for handling chemicals or fuels where the inner layer of the hose has the chemical resistance properties of a PTFE "lining". Other application (article) embodiments include encoders and co-extruded fuel hose (fuel line) where an inner liner cured from an electrically conductive fluoropolymer material as described herein is grounded to dissipate any electrostatic charge buildup due to fuel passage through the fuel line. In making an embodiment of the fuel line, the electrically conductive fluoropolymer material inner layer of the fuel is co-extruded with the structural material of the fuel hose and then the resulting fuel hose precursor is subsequently cured with an electron beam to provide the fuel hose. As referred to herein, the terms "fuel hose" and "fuel line" include any conduit for a volatile hydrocarbon liquid. In a preferred embodiment, the liquid is operable as a fuel for a combustion process, such as gasoline, diesel or similar hydrocarbon fuel. In various embodiments, combustion processes include those of an internal combustion engine and hydrocarbon reforming.

The examples and other embodiments described herein are exemplary and not intended to be limiting in describing the full scope of compositions and methods of this invention. Equivalent changes, modifications and variations of specific embodiments, materials, compositions and methods may be made within the scope of the present invention, with substantially similar results.

What is claimed is:

1. A composition comprising:
   (a) a continuous polymeric phase of cured fluoropolymer selected from the group consisting of:
      (1) fluoroelastomer vulcanized to provide a compressive set value from about 5 to about 100 percent of a mathematical difference between a non-vulcanized compressive set value for said fluoroelastomer and a fully-vulcanized compressive set value for said fluoroelastomer;
      (2) fluoroelastomer thermoplastic vulcanizate vulcanized to provide a compressive set value from about 5 to about 100 percent of a mathematical difference between a non-vulcanized compressive set value for said fluoroelastomer of said fluoroelastomer thermoplastic vulcanizate and a fully-vulcanized compressive set value for said fluoroelastomer of said fluoroelastomer thermoplastic vulcanizate;
      (3) fluoroelastomer-based thermoplastic elastomer vulcanized to provide a compressive set value from about 5 to about 100 percent of a mathematical difference between a non-vulcanized compressive set value for said thermoplastic elastomer and a fully-vulcanized compressive set value for said thermoplastic elastomer; and
      (4) a blend of fluoroelastomer precursor gum and thermoplastic wherein said precursor gum has a glass transition temperature, a decomposition temperature, a Mooney viscosity of from about 0 to about 150 $ML_{1+10}$ at 121 degrees Celsius, and, at a temperature having a value that is not less than said glass transition temperature and not greater than said decomposition temperature, a compressive set value from about 0 to about 5 percent of a mathematical difference between a non-vulcanized compressive set value for fluoroelastomer derived from said fluoroelastomer precursor gum and a fully-vulcanized compressive set value for said derived fluoroelastomer; and (b) a dispersed phase of conductive particulate, said dispersed phase comprising a plurality of conductive particles dispersed in said continuous polymeric phase, so that said composition provides an electrically conductive polymeric material having an electrical resistivity of less than $1\times10^{-3}$ Ohm-m at 20 degrees Celsius.

2. The composition of claim 1 wherein said fluoroelastomer is selected from the group consisting of
(i) vinylidene fluoride/hexafluoropropylene copolymer fluoroelastomer having from about 66 weight percent to about 69 weight percent fluorine and a Mooney viscosity of from about 0 to about 130 $ML_{1+10}$ at 121 degrees Celsius,
(ii) vinylidene fluoride/perfluorovinyl ether/tetrafluoroethylene terpolymer fluoroelastomer having at least one cure site monomer and from about 64 weight percent to about 67 weight percent fluorine and a Mooney viscosity of from about 50 to about 100 $ML_{1+10}$ at 121 degrees Celsius,
(iii) tetrafluoroethylene/propylene/vinylidene fluoride terpolymer fluoroelastomer having from about 59 weight percent to about 63 weight percent fluorine and a Mooney viscosity of from about 25 to about 45 $ML_{1+10}$ at 121 degrees Celsius,
(iv) tetrafluoroethylene/ethylene/perfluorovinyl ether terpolymer fluoroelastomer having at least one cure site monomer and from about 60 weight percent to about 65 weight percent fluorine and a Mooney viscosity of from about 40 to about 80 $ML_{1+10}$ at 121 degrees Celsius,
(v) vinylidene fluoride/hexafluoropropylene/tetrafluoroethylene terpolymer fluoroelastomer having at least one cure site monomer and from about 66 weight percent to about 72.5 weight percent fluorine and a Mooney viscosity of from about 15 to about 90 $ML_{1+10}$ at 121 degrees Celsius,
(vi) tetrafluoroethylene/propylene copolymer fluoroelastomer having about 57 weight percent fluorine and a Mooney viscosity of from about 25 to about 115 $ML_{1+10}$ at 121 degrees Celsius,
(vii) tetrafluoroethylene/ethylene/perfluorovinyl ether/vinylidene fluoride tetrapolymer fluoroelastomer having at least one cure site monomer and from about 59 weight percent to about 64 weight percent fluorine and a Mooney viscosity of from about 30 to about 70 $ML_{1+10}$ at 121 degrees Celsius,
(viii) tetrafluoroethylene/perfluorovinyl ether copolymer fluoroelastomer having at least one cure site monomer and from about 69 weight percent to about 71 weight percent fluorine and a Mooney viscosity of from about 60 to about 120 $ML_{1+10}$ at 121 degrees Celsius,
(ix) fluoroelastomer corresponding to the formula

wherein TFE is essentially a tetrafluoroethyl block, HFP is essentially a hexafluoropropyl block, and VdF is essentially a vinylidyl fluoride block, and products qd and rd and sd collectively provide proportions of TFE, HFP, and VdF whose values are within element 101 of FIG. 1, and
(x) combinations thereof.

3. The composition of claim 1 wherein said wherein said conductive particulate is selected from the group consisting of conductive carbon black, conductive carbon fiber, conductive carbon nanotubes, conductive graphite powder, conductive graphite fiber, bronze powder, bronze fiber, steel powder, steel fiber, iron powder, iron fiber, copper powder, copper fiber, silver powder, silver fiber, aluminum powder, aluminum fiber, nickel powder, nickel fiber, wolfram powder, wolfram fiber, gold powder, gold fiber, copper-manganese alloy powder, copper-manganese fiber, and combinations thereof.

4. The composition of claim 1 further comprising filler selected from the group consisting of fiberglass particulate, inorganic fiber particulate, carbon fiber particulate, ground rubber particulate, polytetrafluorinated ethylene particulate, microspheres, carbon nanotubes, and combinations thereof.

5. The composition of claim 1 wherein said cured fluoropolymer is cured from fluoropolymer precursor selected from the group consisting of fluoroelastomer vulcanized to provide a compressive set value from about 5 to about 100 percent of a mathematical difference between a non-vulcanized compressive set value for said fluoroelastomer and a fully-vulcanized compressive set value for said fluoroelastomer, fluoroelastomer thermoplastic vulcanizate vulcanized to provide a compressive set value from about 5 to about 100 percent of a mathematical difference between a non-vulcanized compressive set value for said fluoroelastomer of said fluoroelastomer thermoplastic vulcanizate and a fully-vulcanized compressive set value for said fluoroelastomer of said fluoroelastomer thermoplastic vulcanizate, fluoroelastomer-based thermoplastic elastomer vulcanized to provide a compressive set value from about 5 to about 100 percent of a mathematical difference between a non-vulcanized compressive set value for said thermoplastic elastomer and a fully-vulcanized compressive set value for said thermoplastic elastomer, and a blend of fluoroelastomer precursor gum and thermoplastic wherein said precursor gum has a glass transition temperature, a decomposition temperature, a Mooney viscosity of from about 0 to about 150 $ML_{1+10}$ at 121 degrees Celsius, and, at a temperature having a value that is not less than said glass transition temperature and not greater than said decomposition temperature, a compressive set value from about 0 to about 5 percent of a mathematical difference between a non-vulcanized compressive set value for fluoroelastomer derived from said fluoroelastomer precursor gum and a fully-vulcanized compressive set value for said derived fluoroelastomer; and
said conductive particulate is selected from the group consisting of conductive carbon black, conductive carbon fiber, conductive carbon nanotubes, conductive graphite powder, conductive graphite fiber, bronze powder, bronze fiber, steel powder, steel fiber, iron powder, iron fiber, copper powder, copper fiber, silver powder, silver fiber, aluminum powder, aluminum fiber, nickel powder, nickel fiber, wolfram powder, wolfram fiber, gold powder, gold fiber, copper-manganese alloy powder, copper-manganese fiber, and combinations thereof.

6. The composition of claim 5 wherein said fluoroelastomer is selected from the group consisting of
(i) vinylidene fluoride/hexafluoropropylene copolymer fluoroelastomer having from about 66 weight percent to about 69 weight percent fluorine and a Mooney viscosity of from about 0 to about 130 $ML_{1+10}$ at 121 degrees Celsius, (ii) vinylidene fluoride/perfluorovinyl ether/tetrafluoroethylene terpolymer fluoroelastomer having at least one cure site monomer and from about 64 weight percent to about 67 weight percent fluorine and a Mooney viscosity of from about 50 to about 100 $ML_{1+10}$ at 121 degrees Celsius, (iii) tetrafluoroethylene/propylene/vinylidene fluoride terpolymer fluoroelastomer having from about 59 weight percent to about 63 weight percent fluorine and a Mooney viscosity of from about 25 to about 45 $ML_{1+10}$ at 121 degrees Celsius, (iv) tetrafluoroethylene/ethylene/perfluorovinyl ether terpolymer fluoroelastomer having at least one cure site monomer and from about 60 weight percent to about 65 weight percent fluorine and a Mooney viscosity of from about 40 to about 80 $ML_{1+10}$ at 121 degrees Celsius, (v) vinylidene fluoride/hexafluoropropylene/tetrafluoroethylene terpolymer fluoroelastomer having at least one cure site monomer and from about 66 weight percent to about 72.5 weight percent fluorine and a Mooney viscosity of from about 15 to about 90 $ML_{1+10}$ at 121 degrees Celsius, (vi) tetrafluoroethylene/propylene copolymer fluoroelastomer having about 57 weight percent fluorine and a Mooney viscosity of from about 25 to about 115 $ML_{1+10}$ at 121 degrees Celsius, (vii) tetrafluoroethylene/ethylene/perfluorovinyl ether/vinylidene fluoride tetrapolymer fluoroelastomer having at least one cure site monomer and from about 59 weight percent to about 64 weight percent fluorine and a Mooney viscosity of from about 30 to about 70 $ML_{1+10}$ at 121 degrees Celsius, (viii) tetrafluoroethylene/perfluorovinyl ether copolymer fluoroelastomer having at least one cure site monomer and from about 69 weight percent to about 71 weight percent fluorine and a Mooney viscosity of from about 60 to about 120 $ML_{1+10}$ at 121 degrees Celsius, (ix) fluoroelastomer corresponding to the formula $$[-TFE_q-HFP_r-VdF_s-]_d$$

wherein TFE is essentially a tetrafluoroethyl block, HFP is essentially a hexafluoropropyl block, and VdF is essentially a vinylidyl fluoride block, and products qd and rd and sd collectively provide proportions of TFE, HFP, and VdF whose values are within element 101 of FIG. 1, and (x) combinations thereof.

7. The composition of claim 1 wherein said conductive particles are coated with a coating to provide coated conductive particles as said conductive particulate, said conductive particles having a first surface tension between said conductive particles and said fluoropolymer, said coated conductive particles having a second surface tension between said coated conductive particles and said fluoropolymer, said second surface tension less than said first surface tension.

8. The composition of claim 1 wherein said conductive particles consist essentially of conductive particles that independently have a cross-sectional diameter from about 0.1 microns to about 100 microns.

9. The composition of claim 1 wherein said cured fluoropolymer comprises from about 20 weight percent to about 90 weight percent of said composition.

10. The composition of claim 1 wherein said cured fluoropolymer is derived from radiation curing of a fluoropolymer precursor.

11. The composition of claim 10 wherein said radiation is selected from the group consisting of ultraviolet radiation, infrared radiation, ionizing radiation, electron beam radiation, x-ray radiation, an irradiating plasma, a discharging corona, and a combination of these.

12. The composition of claim 1 wherein said cured fluoropolymer is derived from curing fluoroelastomer with a curing agent selected from the group consisting of a peroxide, a bisphenol, and a combination of these.

\* \* \* \* \*